United States Patent
Wang et al.

(10) Patent No.: US 10,850,634 B2
(45) Date of Patent: Dec. 1, 2020

(54) MULTI-TURN CONFIGURABLE GRID CHARGING COIL

(71) Applicant: Toyota Motor Engineering & Manufacturing North America, Inc., Erlanger, KY (US)

(72) Inventors: Chi-Ming Wang, Ann Arbor, MI (US); Ercan M. Dede, Ann Arbor, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 92 days.

(21) Appl. No.: 15/789,863

(22) Filed: Oct. 20, 2017

(65) Prior Publication Data

US 2019/0118657 A1 Apr. 25, 2019

(51) Int. Cl.
*B60L 53/00* (2019.01)
*B60L 53/39* (2019.01)
(Continued)

(52) U.S. Cl.
CPC .............. *B60L 53/39* (2019.02); *B60L 53/12* (2019.02); *B60L 53/126* (2019.02); *H02J 50/10* (2016.02); *H02J 50/90* (2016.02); *Y02T 90/12* (2013.01)

(58) Field of Classification Search
CPC .... B60L 11/1831; B60L 11/182; B60L 53/39; B60L 53/12; B60L 53/126; H02J 50/10;
(Continued)

(56) References Cited

U.S. PATENT DOCUMENTS 5,467,084 A * 11/1995 Alofs ................... G05D 1/0261
340/933
5,573,090 A * 11/1996 Ross ....................... B60L 5/005
191/10

(Continued)

FOREIGN PATENT DOCUMENTS

WO WO2012/136303 10/2012
WO WO2013/127445 9/2013

OTHER PUBLICATIONS

Inductive Charging; Wikipedia; printed date Sep. 12, 2017 (10 pages).

(Continued)

*Primary Examiner* — Naum Levin
(74) *Attorney, Agent, or Firm* — Snell & Wilmer LLP (57) ABSTRACT

Methods, systems, and devices for an external vehicle charging system. The external vehicle charging system includes a first set of inductive coils. The first set of inductive coils include a first inductive coil and a second inductive coil and are configured to provide an alternating magnetic field to one or more inductive loops of a vehicle. The external vehicle charging system includes a sensor configured to detect a position of the one or more inductive loops and a processor. The processor is configured to determine a first threshold distance between the first inductive coil and the second inductive coil to reduce or eliminate interference. The processor is configured to activate the first inductive coil and the second inductive coil so that the first inductive coil and the second inductive coil align with the one or more inductive loops based on the detected position and the first threshold distance.

20 Claims, 6 Drawing Sheets

(51) Int. Cl.
*H02J 50/10* (2016.01)
*B60L 53/12* (2019.01)
*H02J 50/90* (2016.01)
*B60L 53/126* (2019.01)

(58) Field of Classification Search
CPC ......... H02J 7/025; H02J 50/90; Y02T 90/125; Y02T 90/12
See application file for complete search history.

(56) References Cited

U.S. PATENT DOCUMENTS

| | | | |
|---|---|---|---|
| 7,243,752 B2 * | 7/2007 | Green | B60L 5/005 |
| | | | 180/168 |
| 8,466,654 B2 * | 6/2013 | Cook | H01Q 7/00 |
| | | | 320/109 |
| 8,884,581 B2 * | 11/2014 | Widmer | B60L 11/182 |
| | | | 320/108 |
| 8,975,864 B2 * | 3/2015 | Kim | B60L 11/182 |
| | | | 320/109 |
| 9,027,723 B2 * | 5/2015 | Niizuma | H02J 5/005 |
| | | | 191/10 |
| 9,090,170 B2 | 7/2015 | Mashinsky et al. | |
| 9,112,364 B2 | 8/2015 | Partovi | |
| 9,135,803 B1 | 9/2015 | Fields et al. | |
| 9,187,006 B2 * | 11/2015 | Chen | B60L 53/126 |
| 9,203,258 B2 * | 12/2015 | Wechlin | B60L 11/182 |
| 9,327,608 B2 | 5/2016 | Gibbons, Jr. | |
| 9,409,491 B2 * | 8/2016 | Ichikawa | B60L 11/1833 |
| 9,441,603 B2 | 9/2016 | Khan et al. | |
| 9,463,705 B2 * | 10/2016 | Grabar | H02J 50/90 |
| 9,463,707 B2 | 10/2016 | Lewis | |
| 9,466,419 B2 | 10/2016 | Boys et al. | |
| 9,496,746 B2 * | 11/2016 | Mi | H04B 5/0037 |
| 9,511,674 B2 | 12/2016 | Keeling et al. | |
| 9,533,590 B2 | 1/2017 | Keeling et al. | |
| 9,577,440 B2 | 2/2017 | Partovi et al. | |
| 9,577,466 B2 | 2/2017 | Ku et al. | |
| 9,608,453 B2 * | 3/2017 | Shijo | H04B 5/0037 |
| 9,637,014 B2 * | 5/2017 | Schneider | H02J 7/025 |
| 9,649,948 B2 * | 5/2017 | Bell | H02J 50/90 |
| 9,747,792 B2 * | 8/2017 | Boys | H04B 5/0043 |
| 9,774,218 B2 * | 9/2017 | Kai | H02J 17/00 |
| 9,780,574 B2 * | 10/2017 | Niizuma | B60L 53/36 |
| 9,836,972 B2 * | 12/2017 | Kees | G08G 1/0968 |
| 9,837,204 B2 * | 12/2017 | Widmer | H01F 38/14 |
| 9,908,426 B2 * | 3/2018 | Fukushima | B60L 53/37 |
| 9,953,761 B2 * | 4/2018 | Scholz | H01F 38/14 |
| 9,973,043 B2 * | 5/2018 | Koizumi | H02J 7/00034 |
| 9,981,566 B2 * | 5/2018 | Ichikawa | B60L 11/1829 |
| 9,994,255 B2 * | 6/2018 | Nakagawa | B62D 15/029 |
| 10,011,182 B2 * | 7/2018 | Salter | B60L 11/1831 |
| 10,040,362 B2 * | 8/2018 | Kim | B60L 53/39 |
| 10,069,336 B2 * | 9/2018 | Fackelmeier | H01Q 9/0485 |
| 10,086,715 B2 * | 10/2018 | Lewis | B60L 11/1829 |
| 10,122,211 B2 * | 11/2018 | Takatsu | H02J 5/005 |
| 10,124,684 B2 * | 11/2018 | Merkel | H02J 7/025 |
| 10,325,717 B2 * | 6/2019 | Boys | H02J 7/025 |
| 10,351,008 B2 * | 7/2019 | Seong | H02J 50/10 |
| 10,399,448 B2 * | 9/2019 | Seong | B60L 53/665 |
| 10,427,549 B2 * | 10/2019 | Yang | B60L 53/126 |
| 2011/0184842 A1 * | 7/2011 | Melen | B60L 5/005 |
| | | | 705/34 |
| 2013/0009462 A1 * | 1/2013 | Amano | B60L 5/005 |
| | | | 307/9.1 |
| 2013/0037339 A1 | 2/2013 | Hickox | |
| 2013/0038276 A1 | 2/2013 | Raedy | |
| 2013/0249299 A1 * | 9/2013 | Shijo | H02J 50/80 |
| | | | 307/80 |
| 2014/0145514 A1 | 5/2014 | Konno et al. | |
| 2014/0217966 A1 * | 8/2014 | Schneider | H02J 7/025 |
| | | | 320/108 |
| 2014/0327391 A1 | 11/2014 | Niederhauser et al. | |
| 2015/0109000 A1 | 4/2015 | Sieber et al. | |
| 2015/0246614 A1 | 9/2015 | Dames et al. | |
| 2015/0298559 A1 * | 10/2015 | Keeling | B60M 1/36 |
| | | | 320/108 |
| 2015/0333560 A1 | 11/2015 | Brach et al. | |
| 2015/0371771 A1 | 12/2015 | Abu Qahouq | |
| 2015/0372529 A1 * | 12/2015 | Lampinen | H02J 5/005 |
| | | | 455/572 |
| 2016/0001662 A1 | 1/2016 | Miller et al. | |
| 2016/0013661 A1 * | 1/2016 | Kurs | H02J 50/70 |
| | | | 307/104 |
| 2016/0043571 A1 * | 2/2016 | Kesler | H02J 50/70 |
| | | | 307/104 |
| 2016/0105036 A1 * | 4/2016 | Raghunathan | H02J 50/40 |
| | | | 320/108 |
| 2016/0121732 A1 | 5/2016 | Matsumoto et al. | |
| 2016/0134162 A1 * | 5/2016 | Koizumi | H02J 50/10 |
| | | | 307/9.1 |
| 2016/0243949 A1 * | 8/2016 | Merkel | H02J 7/025 |
| 2016/0285317 A1 * | 9/2016 | Maniktala | H02J 50/12 |
| 2016/0318413 A1 | 11/2016 | Roehrl et al. | |
| 2016/0325631 A1 * | 11/2016 | Lannoije | B60L 53/124 |
| 2016/0380469 A1 | 12/2016 | Lethellier et al. | |
| 2017/0028854 A1 | 2/2017 | Lee et al. | |
| 2017/0136908 A1 * | 5/2017 | Ricci | B60L 11/1831 |
| 2017/0225582 A1 * | 8/2017 | Augst | B60L 53/36 |
| 2017/0264143 A1 * | 9/2017 | Lee | H01F 38/14 |
| 2018/0093579 A1 * | 4/2018 | Fukushima | B62D 15/027 |
| 2018/0166929 A1 * | 6/2018 | Sawai | B60L 53/12 |
| 2018/0287413 A1 * | 10/2018 | Jung | H02J 7/00 |
| 2018/0290550 A1 * | 10/2018 | Yang | H02J 7/025 |
| 2018/0301933 A1 * | 10/2018 | Lee | H01F 38/14 |
| 2018/0356833 A1 * | 12/2018 | Ohman | B60L 53/12 |
| 2019/0097471 A1 * | 3/2019 | Pantic | H02J 50/90 |
| 2020/0094700 A1 * | 3/2020 | Hui | H02J 50/90 |

OTHER PUBLICATIONS

Wireless Charging & How Inductive Chargers Work; PowerbyProxi website; printed date Sep. 12, 2017 (18 pages).

* cited by examiner

MULTI-TURN CONFIGURABLE GRID CHARGING COIL

BACKGROUND

1. Field

This specification relates to a system and a method for inductively and/or wirelessly charging a vehicle.

2. Description of the Related Art

Vehicles, such as electric vehicles (EV) and plug-in hybrid vehicles (PHV) may charge their batteries via inductive charging. Inductive charging, also known as wireless charging, uses an electromagnetic field to transfer electrical energy between a source, such as a charging station, and a device, such as an EV or PHV vehicle, that stores and/or uses the electrical charge. An inductive coil at a power source, such as a charging station, creates an alternating electromagnetic field which is transmitted to an inductive coil (or "inductive loop") at the vehicle that converts the power from the electromagnetic field into an electric current to charge a battery and/or run the vehicle. The inductive coil of the charging station is often in a fixed position and the vehicle is placed or positioned on or near the charging station. The corresponding inductive loop of the vehicle, however, may be misaligned with the inductive coil of the charging station which results in a decrease in the efficiency of the transfer of electrical energy. That is, when the corresponding loop is mis-aligned electrical energy is lost in the transfer of the electrical energy to the corresponding inductive loop.

Accordingly, there is a need for a system and a method to improve the efficiency of wirelessly charging the vehicle.

SUMMARY

In general, one aspect of the subject matter described in this specification is embodied in an external vehicle charging system. The external vehicle charging system includes a first set of inductive coils. The first set of inductive coils include a first inductive coil and a second inductive coil. The first set of inductive coils are configured to provide an alternating magnetic field to one or more inductive loops of a vehicle. The external vehicle charging system includes a sensor configured to detect a position of the one or more inductive loops of the vehicle and a processor connected to the first set of inductive coils and the sensor. The processor is configured to determine a first threshold distance between the first inductive coil and the second inductive coil to reduce or eliminate interference between the first and second inductive coils. The processor is configured to activate the first inductive coil and the second inductive coil so that the first inductive coil and the second inductive coil align with the one or more inductive loops based on the detected position and the first threshold distance so that the first inductive coil is spaced apart from the second inductive coil by at least the first threshold distance.

These and other embodiments may optionally include one or more of the following features. The processor may be configured to position the first inductive coil within the first threshold distance of the second inductive coil and within a second threshold distance of the one or more inductive loops. The first inductive coil may be adjacent to the second inductive coil. The processor may be further configured to move the first inductive coil in at least one of a vertical direction perpendicular to a plane of the charging pad or a lateral direction parallel to the plane of the charging pad.

The external vehicle charging system may have a first layer of inductive coils that includes the first set of inductive coils and a second layer of inductive coils that includes a second set of inductive coils. The second set of inductive coils may be vertically aligned and below the first set of inductive coils. The second set of inductive coils may be offset from the first set of inductive coils. The first set of inductive coils and the second set of inductive coils may be in a fixed position. The first set of inductive coils may be configured to move in a lateral direction within the first layer of inductive coils and the second set of inductive coils may be configured to move in the lateral direction within the second layer of inductive coils.

In another aspect, the subject matter is embodied in a method for wirelessly charging a vehicle. The method includes obtaining a position of the one or more inductive loops of the vehicle. The method includes determining a first threshold distance that minimizes or eliminates interference between two or more adjacent inductive coils of the multiple inductive coils. The method includes activating the two or more adjacent inductive coils based on the first threshold distance and the position of the one or more inductive loops to provide an alternating magnetic field to the one or more inductive loops of the vehicle.

In another aspect, the subject matter is embodied in a method for an external charging system. The external vehicle charging system includes multiple layers of inductive coils with each layer of inductive coils having multiple inductive coils. The external vehicle charging system includes a sensor that is configured to detect a position of one or more inductive loops of a vehicle. The external vehicle charging system includes one or more switches that are connected to each inductive coil. The external vehicle charging system includes a processor that is connected to the one or more switches. The processor is configured to determine a first threshold distance for minimizing crosstalk between two or more adjacent inductive coils and close a switch of the one or more switches to activate a first switch of the two or more adjacent inductive coils based on the detected position and the determined first threshold distance.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, devices and methods for wirelessly charging a vehicle. Particular embodiments of the subject matter described in this specification may be implemented to realize one or more of the following advantages.

An external vehicle charging system that transmits a wireless charging signal from a charging station to charge one or more power storage devices, such as a battery, and/or provide power to move the vehicle. The external vehicle charging system has one or more inductive coils that transmit the wireless charging signal by generating a magnetic field using an alternating current (AC). The magnetic field may extend to one or more inductive loops of the vehicle and generate current within the one or more inductive loops.

The external vehicle charging system has multiple inductive coils. The multiple inductive coils may be configured to emit a magnetic field to induce a current within multiple inductive loops on the vehicle that is converted to electrical energy to store in multiple power storage devices, such as batteries. By having multiple inductive coils corresponding to the multiple inductive loops, the external vehicle charging system is able to charge the batteries of the vehicle in parallel and in a distributed manner which reduces the charge time of the vehicle. Moreover, the multiple inductive coils may be positioned in multiple layers and/or may be movable. This, along with the capability to notify a driver to adjust or move their vehicle, allows the correction of any mis-alignment between the multiple inductive coils and the inductive loops of the vehicle to improve efficiency of the transfer of electrical energy to the vehicle.

Other benefits and advantages include having multiple layers of inductive coils. The multiple layers of inductive coils may have a variety of arrangements and/or positions. The multiple layers of inductive coils may be offset to eliminate or reduce any gaps in the magnetic field between adjacent inductive coils. Additionally, the multiple layers of inductive coils may be stacked to increase the magnitude of the magnetic field that is generated by the multiple inductive coils to increase the amount of electrical energy that is generated by the corresponding inductive loop.

Additionally, the external vehicle charging system may position two adjacent inductive coils such that the crosstalk or electrical interference between the two adjacent inductive coils is reduced and/or minimized. This increases the efficiency of transmitting the wireless charging signal to the inductive loops of the vehicle. Also, the accurate positioning of the two adjacent inductive coils reduces the charging time of the power storage devices, such as the batteries of the vehicle.

Figure 1:
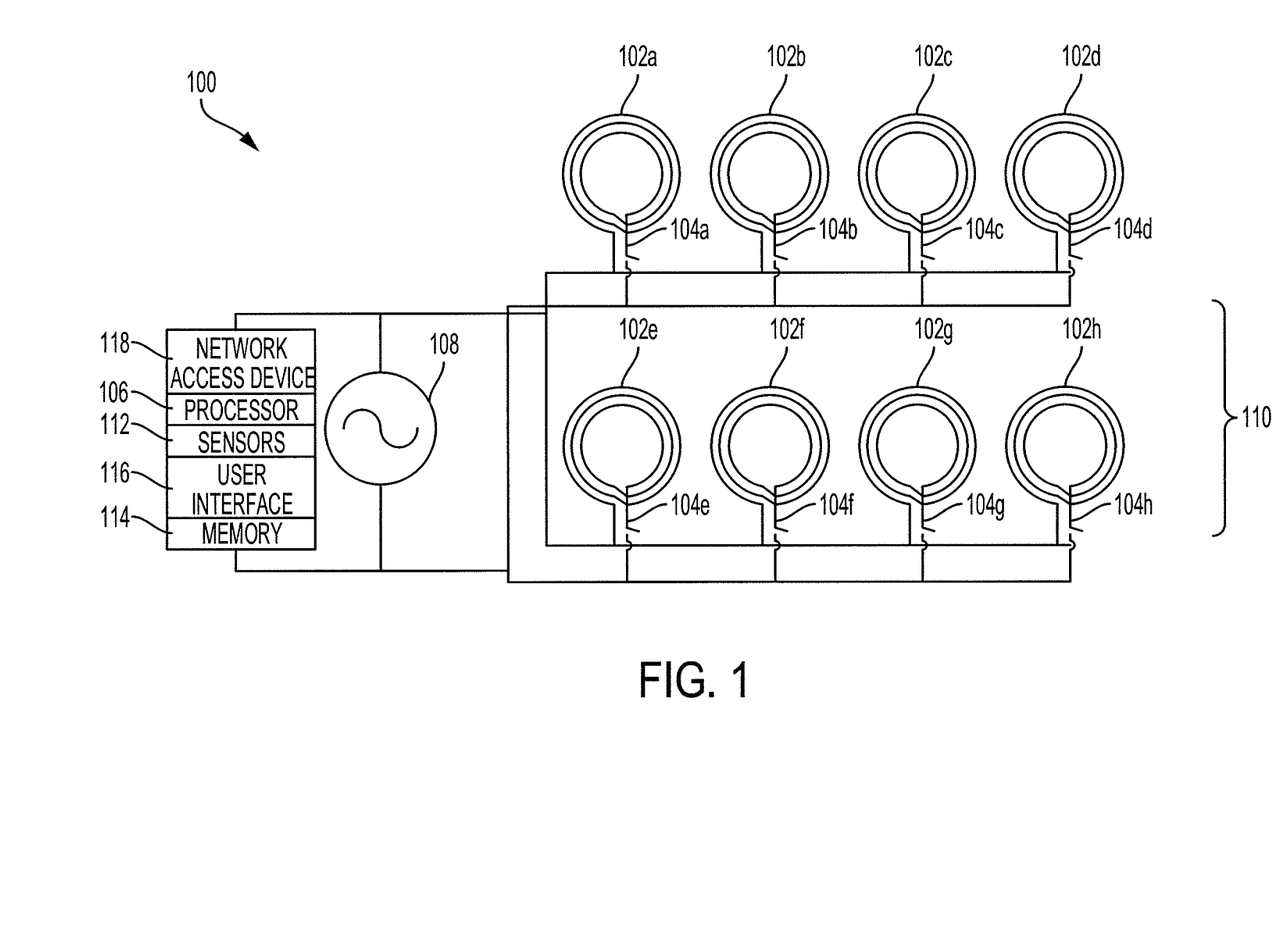
FIG. 1 is a schematic of an example external vehicle charging system to charge a vehicle according to an aspect of the invention.
Figure 2:
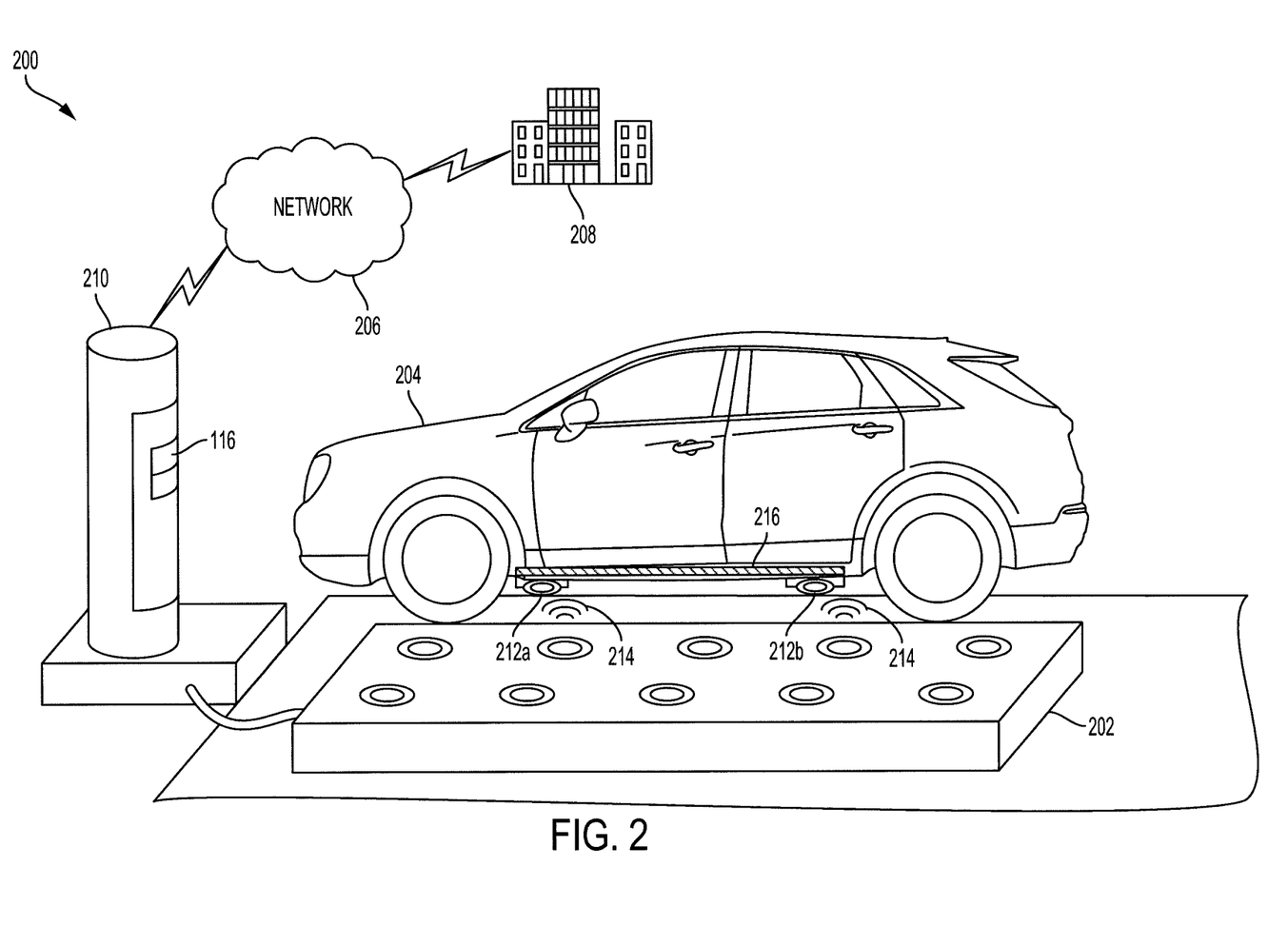
FIG. 2 shows an example external vehicle charging system of FIG. 1 integrated into a charging station charging a vehicle according to an aspect of the invention.

FIG. 1 is a schematic of an example external vehicle charging system 100. The external vehicle charging system 100 ("charging system") is included within, connected to or a part of a charging station 210 that has a charging pad 202, as shown in FIG. 2, for example. The external vehicle charging system 100 transmits a wireless charging signal, such as an alternating magnetic field, that when received by or is within a proximity of one or more inductive loops of a vehicle 204 causes the inductive loop to generate electrical energy to be stored in the one or more batteries 216 of the vehicle 204 and/or used by the vehicle 204 to move.

The external vehicle charging system 100 includes a processor 106, a power source 108, a memory 114 and a configurable grid 110. The configurable grid 110 includes one or more inductive coils 102*a-h* and one or more switches 104*a-h*. The charging system 100 may include a user interface 116, a network access device 118 and/or one or more sensors 112.

The charging system 100 has one or more computers, such as a processor 106. The processor 106 may be a controller, a microprocessor or other control device that executes or performs operations stored on or in the memory 114. The processor 106 may be remote or local to a charging station. The processor 106 may be configured to control the various components including the network access device 118, the one or more sensors 112, the one or more switches 104*a-h*, the power source 108 and the one or more inductive coils 102*a-h* to detect the vehicle 204 on the charging pad 202 of the charging station 210, activate or deactivate power to the one or more inductive coils 102*a-h* to charge the vehicle 204, control the motion and/or direction of movement of the one or more inductive coils 102*a-h* and/or process payment information.

The following are examples of different forms of control the processor 106 may employ. The processor 106 may communicate with a payment center 208 using the network access device 118 to communicate through a network 206 to accept, verify and/or otherwise process payment information. The processor 106 may open or close the one or more switches 104*a-h* to form a closed-circuit to activate or deactivate one or more inductive coils 102*a-h*. The processor may three-dimensionally control the motion of the one or more inductive coils 102*a-h*.

The charging system 100 includes a memory 114. The memory 114 may be coupled to the one or more processors 106. The memory 114 may store instructions to execute on the one or more processors 106 and may include one or more of a RAM (Random Access Memory) or other volatile or non-volatile memory. The memory 114 may be a non-transitory memory or a data storage device, such as a hard disk drive, a solid-state disk drive, a hybrid disk drive, or other appropriate data storage, and may further store machine-readable instructions, which may be loaded and executed by the one or more processors 106.

The charging system 100 includes a power source 108. The power source 108 may provide an alternating current (AC) through the configurable grid 110 to emit through one or more inductive coils 102*a-h*. The alternating current through the one or more inductive coils 102*a-h* may create or generate a magnetic field that is transmitted or emanated by the one or more inductive coils 102*a-h*. When an inductive loop of the vehicle 204 is within a threshold distance of the one or more inductive coils 102*a-h*, the magnetic field may generate current within the one or more inductive loops. The current is converted into direct current (DC) which charges or runs the vehicle 204.

The charging system 100 includes a configurable grid 110. The configurable grid 110 has one or more inductive coils 102*a-h* and one or more switches 104*a-h*. The configurable grid 110 may have one or more layers of inductive coils. For example, the configurable grid 110 of FIGS. 4A-4B has a first layer 402a of inductive coils and a second layer 402b of inductive coils. The configurable grid 110 may have one or more inductive coils in each of the one or more layers, e.g., the configurable grid 110 may have multiple inductive coils in a first layer 402a and multiple inductive coils in the second layer 402b. The configurable grid 110 may have any number of inductive coils in any number of layers of inductive coils. Each inductive coil of the one or more inductive coils 102a-h may have any number of turns, such as 3 turns, 5 turns or 10 turns. Each inductive coil may be connected to a switch, such as a switch of the one or more switches 104a-h.

The configurable grid 110 has one or more inductive coils 102a-h. The one or more inductive coils 102a-h may be made from electrically conductive wire. The one or more inductive coils 102a-h may be positioned at different locations of the configurable grid 110. By having multiple inductive coils 102a-h in different positions that are activated, the area covered by the multiple inductive coils 102a-h that are activated compensate for any mis-alignment between the multiple inductive coils 102a-h and the inductive loops 212a-b of the vehicle 204. The multiple inductive coils 102a-h provide a greater likelihood of aligning and/or positioning the inductive coils 102a-h in alignment with the one or more inductive loops 212a-b of the vehicle 204.

The configurable grid 110 has one or more switches 104a-h. The one or more switches 104a-h may each be in an open position or a closed position to form a closed-circuit with one or more inductive coils 102a-h within the configurable grid 110. The processor 106 may control the one or more switches 104a-h and move the one or more switches 104a-h into the open position or the closed position to form the closed-circuit that selectively activates an inductive coil to charge the inductive loops 212a-b of the vehicle 204.

The charging system 100 may have one or more sensors 112. The one or more sensors 112 may include a charging sensor, a proximity sensor, an alignment sensor and/or a camera.

The one or more sensors 112 may include a charging sensor for each of the one or more inductive coils 102a-h. The charging sensor may measure an efficiency factor for each of the one or more inductive coils 102a-h. For example, the charging sensor may detect that an inductive loop of the vehicle 204 is generating an electrical charge from the magnetic field of the inductive coil 102a at approximately 33% efficiency, whereas a different inductive loop of the vehicle 204 is generating an electrical charge from the magnetic field of the inductive coil 102c at approximately 80% efficiency. Thus, the external vehicle charging system 100 may determine that the inductive coil 102c is more efficient than the inductive coil 102a and activate the inductive coil 102c.

The one or more sensors 112 may include a proximity sensor. The proximity sensor may measure or detect a distance from the charging station 210 to the vehicle 204. The charging system 100 may use the measured or detected distance to activate when the vehicle 204 is within a threshold distance of the charging station 210.

Figure 3:
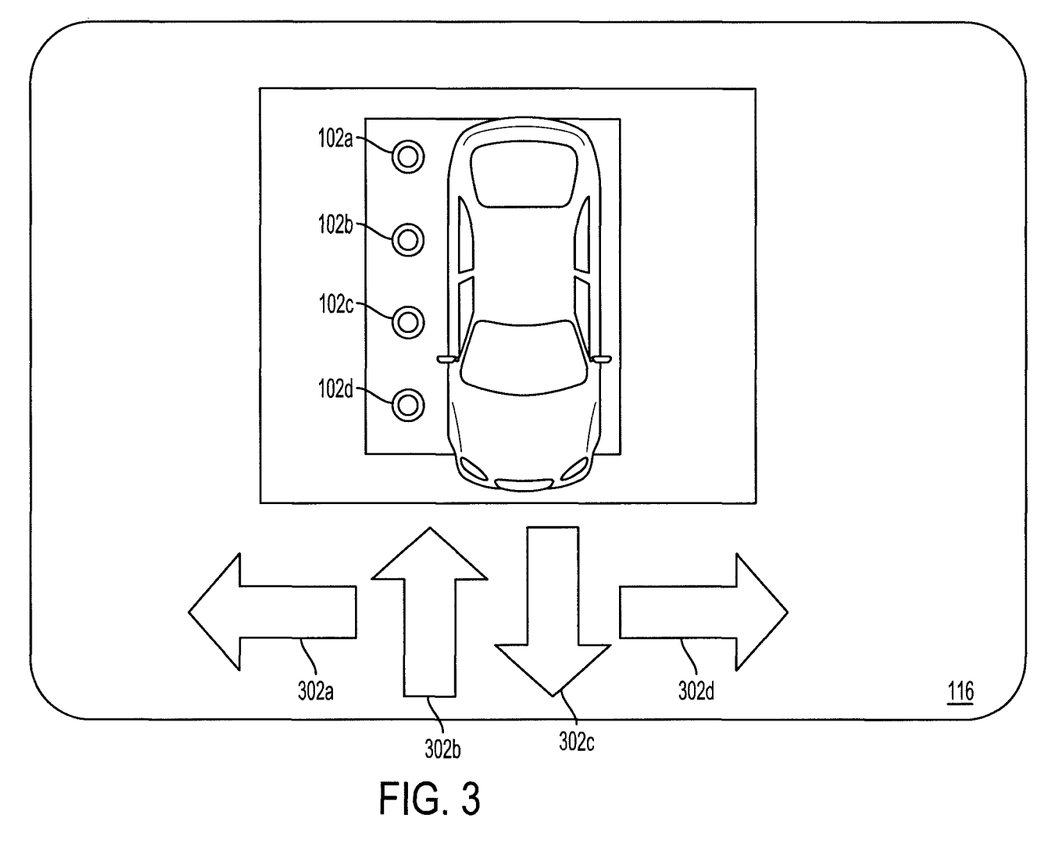
FIG. 3 shows an example user interface that directs the driver of the vehicle to align the vehicle with the charging pad of the charging station according to an aspect of the invention.

The one or more sensors 112 may include an alignment sensor. The alignment sensor and/or the camera may be used to align the one or more inductive coils 102a-h with the one or more inductive loops of the vehicle 204. The alignment sensor may be a target sensor that signals when the target sensor is aligned with an optical sensor on the vehicle 204. When the sensors are aligned, the efficiency of transfer and generation of electrical energy for storage in the vehicle 204 is at its maximum or peak, e.g., approximately 80%-90% efficiency. The alignment sensor may provide an indication of a direction to move the vehicle 204 and/or navigate the vehicle 204 to align the alignment sensor with the target sensor. For example, the charging system 100 may display on the user interface 116 a direction to move the vehicle 204 to align the inductive coils 102a-h with the one or more inductive loops based on the information obtained using the alignment sensor, as shown in FIG. 3, for example.

The one or more sensors 112 may include a camera. The camera may capture an image or a video of an underside of the vehicle 204 and indicate to the driver and/or navigate the vehicle 204 to align the one or more inductive coils 104 with the inductive loops 212a-b of the vehicle 204. The charging system 100 may display on the user interface 116 the direction to move the vehicle 204 to align the inductive coils 102a-h with the one or more inductive loops based on the image or the video from the camera.

The user interface 116 may be positioned on and/or connected to the charging station 210. The user interface 116 may provide an interface for input and/or output. The user interface 116 may have user elements. The user interface 116 may receive user input such as the selection of user elements to obtain one or more configuration settings that position and/or activate the one or more inductive coils 102a-h. The output may include notifications and/or alerts indicating the initialization or use of the charging system 100 and/or the positioning of the one or more inductive coils 102a-h relative to the one or more inductive loops of the vehicle 204.

The charging system 100 may include a network access device 118. The network access device 118 may include a communication port or channel, such as one or more of a Wi-Fi unit, a Bluetooth® unit, a radio frequency identification (RFID) tag or reader, or a cellular network unit for accessing a cellular network (such as 3G or 4G). The network access device 118 may transmit data to and receive data from devices and systems not directly connected to the charging station 210, such as an interconnected network of systems 200 as shown in FIG. 2.

FIG. 2 shows an interconnected network of systems 200 that includes the charging station 210 with the charging system 100 and a vehicle 204. The interconnected network of systems ("network system") 200 may include a vehicle 204, the charging station 210 with the charging pad 202, a network 206 and/or a payment center 208.

The charging station 210 may be coupled to the payment center 208, such as a credit card processor, through the network 206. The network 206, such as a local area network (LAN), a wide area network (WAN), a cellular network, the Internet, or combination thereof, connects the charging station 210 with the payment center 208. The charging station 210 may communicate, through the network access device 118, payment information including credit card information to the payment center 208 to verify and/or authorize payment by a driver of the vehicle 204.

The charging station 210 may have a charging pad 202. The charging pad 202 may be positioned such that the vehicle 204 is positioned above the charging pad 202 to receive the electrical charge from the charging station 210. The charging station 210 may provide power to the charging pad 202 to wirelessly charge the vehicle 204. The charging system 100 may be embedded within or retrofitted to the charging station 210. The one or more inductive coils 102a-h that are within the charging pad 202 may wirelessly charge the vehicle 204 from underneath the vehicle 204. The inductive coils 102a-h may provide an electromagnetic field 214 which is transmitted to the inductive loops 212a-b of the vehicle 204. The inductive loops 212a-b convert the electromagnetic field into an electric current that charges a battery 216 of the vehicle 204.

A vehicle 204 is a conveyance capable of transporting a person, an object, or a permanently or temporarily affixed apparatus. A vehicle 204 may be a self-propelled wheeled conveyance, such as a car, a sports utility vehicle, a truck, a bus, a van or other motor or battery driven vehicle. For example, the vehicle 204 may be an electric vehicle (EV), a hybrid vehicle, a plug-in hybrid vehicle (PHV) or any other type of vehicle that includes one or more batteries, motors and/or generators. Other examples of vehicles include bicycles, trains, planes, or boats, and any other form of conveyance that is capable of transportation. The vehicle 204 may be semi-autonomous or autonomous. That is, the vehicle 204 may be self-maneuvering and navigate without human input. An autonomous vehicle may use one or more sensors and/or navigation unit to drive autonomously.

Figure 4A:
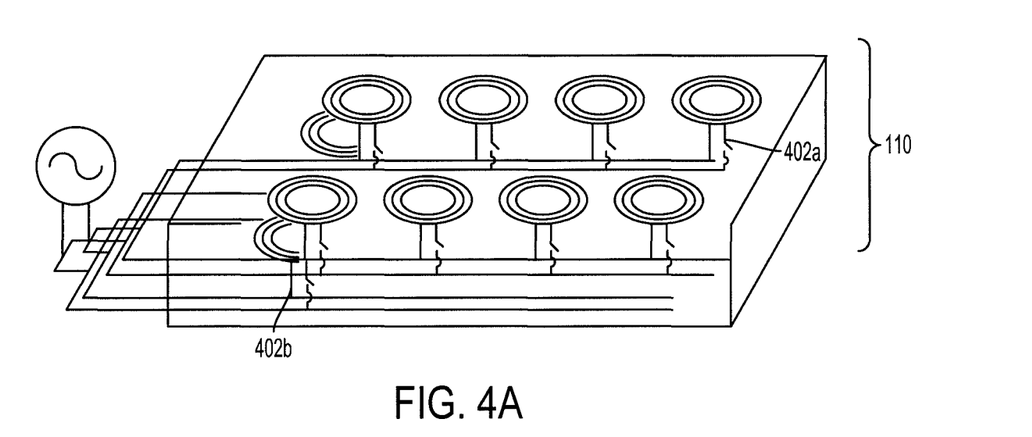
FIG. 4A is a schematic of an example external vehicle charging system of FIG. 1 having multiple layers of inductive coils according to an aspect of the invention.
Figure 4B:
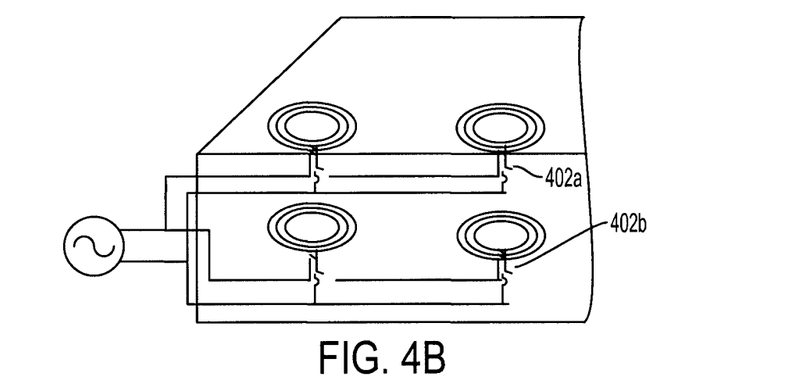
FIG. 4B shows a side perspective view of the external charging system of FIG. 1 having multiple layers of inductive coils vertically aligned according to an aspect of the invention.
Figure 4C:
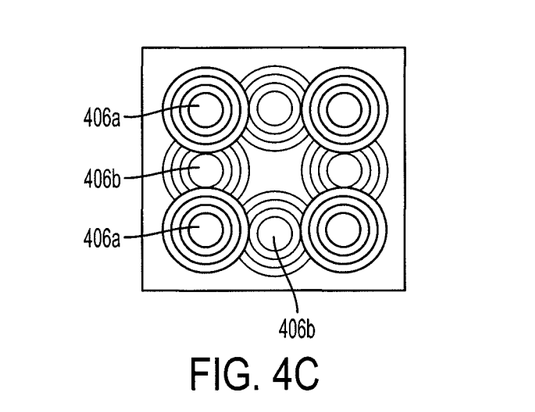
FIG. 4C shows a top perspective view of the external charging system of FIG. 1 having multiple layers of inductive coils that are offset according to an aspect of the invention.

FIGS. 4A-4C show different configurations of the configurable grid 110. The configurable grid 110 may have one or more layers 402a-b of inductive coils including a first layer 402a of inductive coils and a second layer 402b of inductive coils, as shown in FIG. 4A, for example. Each of the one or more inductive coils in the first layer 402a of inductive coils may vertically align with each of the one or more inductive coils in the second layer 402b of inductive coils, as shown in FIG. 4B, for example. By vertically aligning the inductive coils in the different layers of inductive coils, the magnitude, the direction and/or the strength of the magnetic field that is emanated by the charging system 100 may be increased when multiple vertically aligned inductive coils are activated. In some implementations, the one or more inductive coils in the first layer 402a are staggered or offset, e.g., within the z-plane, from the one or more inductive coils in the second layer 402b of inductive coils, as shown in FIG. 4C, for example. That is, the centers 406a of each of the multiple inductive coils within a first layer 402a may be offset from the centers 406b of each of the multiple inductive coils within a second layer 402b. Each of the layers of multiple inductive coils may be connected to an independent power source.

By staggering or offsetting the one or more inductive coils in each layer, the charging system 100 eliminates, minimizes or reduces any gaps or holes between the inductive coils in the charging system 100 so that the emanating magnetic field covers a larger area which increases the likelihood that the inductive loops of the vehicle 204 generate electrical energy. The staggered or offset multiple inductive coils may be densely populated to allow the charging system 100 to operate an inductive coil that is aligned with an inductive loop of the vehicle 204. The staggered or offset configuration of the multiple inductive coils in multiple layers of inductive coils may reduce and/or minimize the electrical interference between activated multiple inductive coils.

Figure 5:
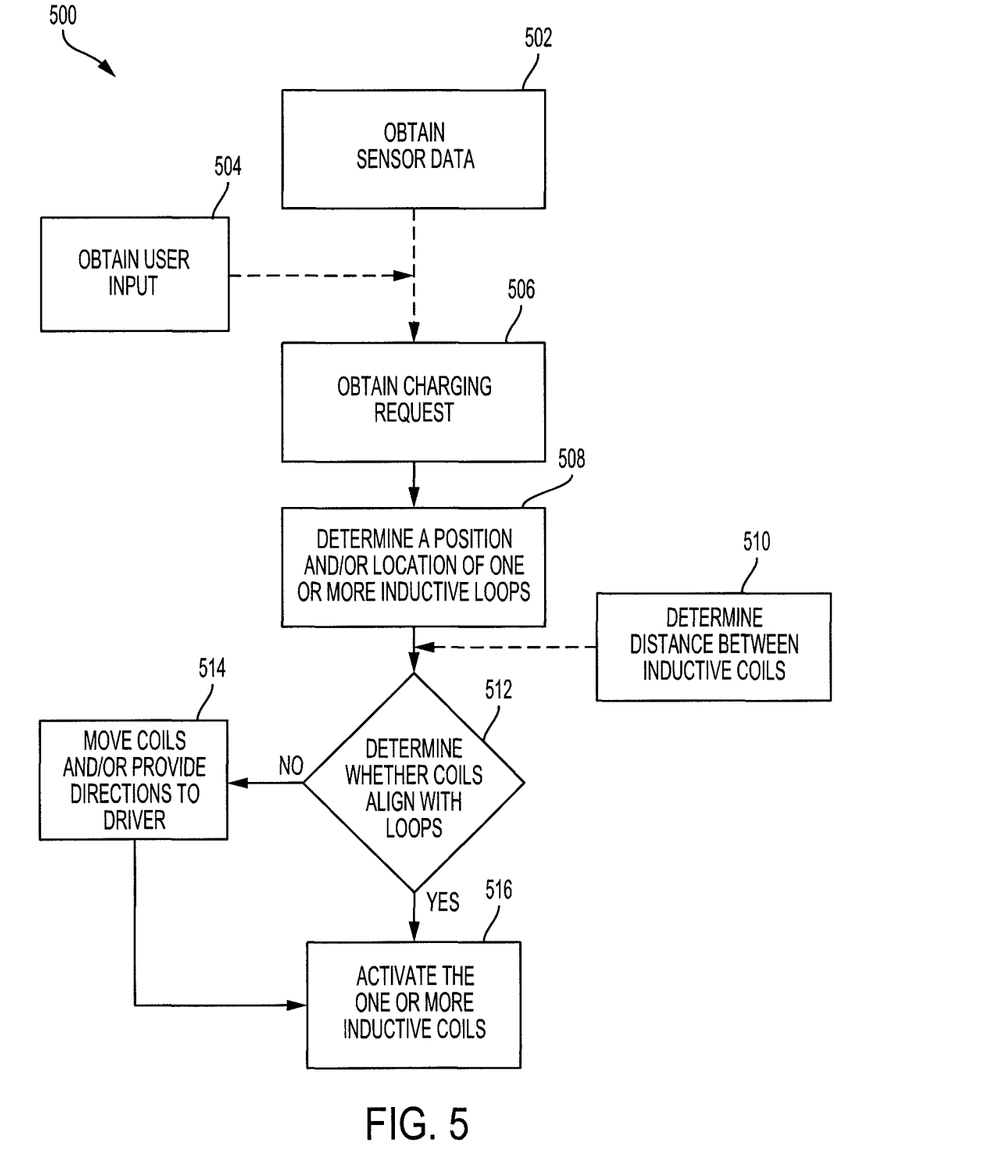
FIG. 5 is a flow diagram of an example process for providing electrical energy to the one or more inductive loops of the vehicle according to an aspect of the invention.

FIG. 5 is a flow diagram of a process 500 for wirelessly charging the vehicle 204. One or more computers or one or more data processing apparatuses, for example, the one or more processors 106 of the external vehicle charging system 100 of FIG. 1, appropriately programmed, may implement the process 500.

The external vehicle charging system ("charging system") 100 may obtain sensor data from one or more sensors 112 (502). The sensor data may include a distance between a vehicle and the charging system 100. The sensor data may measure or detect the distance using a proximity sensor. The sensor data may include a location of the vehicle relative to the charging system 100 and/or a relative direction to move the vehicle to align the inductive loops of the vehicle with the one or more inductive coils 102a-h. The sensor data may include a measurement of an efficiency factor of an inductive loop of the vehicle that is generating electrical energy from a transmitted wireless charging signal. The sensor data may include an image or a video taken using a camera, e.g., an image or a video taken of any objects positioned directly above the charging pad such as the underside of the vehicle 204.

The charging system 100 may receive or obtain user input, e.g., from the user interface 116 (504). The user input may be a selection of a user element associated with one of the inductive coils. The user input may include one or more configuration settings that activate or deactivate one of the inductive coils 102a-h and/or position one of the inductive coils 102a-h. For example, a configuration setting may activate the inductive coil 102a but deactivate the inductive coil 102b by closing one or more switches to form a closed-circuit. In another example, the configuration setting may move the inductive coil 102a in a direction, such as laterally. In some implementations, the charging system 100 may have a default setting for the one or more configuration settings, e.g., a configuration setting where all of the one or more inductive coils 102a-h are activated to transmit the wireless charging signal.

The charging system 100 may obtain a charging request that initiates the charging system 100 (506). The external vehicle charging system 100 may receive the charging request when a user activates the charging system 100, e.g., when the charging station 210 is turned on or a user activates the charging system 100 from the user interface 116 to charge the vehicle 204. The charging system 100 may receive the charging request from the one or more sensors 112. For example, when an EV and/or PHV vehicle 204 is within a threshold distance of the charging station 210, a proximity sensor and/or an alignment sensor may detect the vehicle 204 and initialize the charging system 100 based on the charging request.

The charging system 100 may determine a position and/or a location of one or more inductive loops of the vehicle (508). The charging system 100 may determine the position and/or the location based on the sensor data. The charging system 100 may use a proximity sensor, such as radar, to determine the position and/or the location of the one or more inductive loops of the vehicle. The proximity sensor may measure the time the radar is reflected back and/or the direction of reflection to determine the position and/or the location of one or more inductive loops.

In some implementations, the charging system 100 may have a target sensor that aligns with an optical sensor on the vehicle. The target sensor may provide an indication to the user, e.g., through the user interface 116, when the target sensor and the optical sensor are aligned. Moreover, the target sensor may provide the position and/or the location of the one or more inductive loops. For example, there may be more than one target sensor positioned along the charging pad to identify the location of the optical sensor relative to the target sensor. In another example, the optical sensor identifies the location of the target sensor and the vehicle communicates the location to the charging system 100.

In some implementations, the charging system 100 has a camera that captures an image or a video. The processor 106 may analyze and/or process the image or the video to identify the one or more inductive loops 212a-b of the vehicle 204 and the position and/or the location of the one or more inductive loops 212*a-b* relative to the one or more inductive coils 102*a-h*. The processor 106 may perform image recognition of the one or more inductive loops 212*a-b* by comparing the one or more inductive loops 212*a-b* to a database of objects. The processor 106 may compare dimensions of the identified object from the database to the dimensions of the one or more inductive loops 212*a-b* in the image to determine the distance, the position and/or the location of the one or more inductive loops 212*a-b*.

The charging system 100 may determine a distance between two inductive coils to minimize and/or eliminate interference, such as crosstalk, between the two inductive coils (510). The distance may be based on an amount of current or power that is driven by the power source 108 through the two inductive coils. As the amount of current or power that is driven increases, the distance between the two inductive coils to minimize and/or eliminate interference increases between the two inductive coils. As the amount of current or power that is driven decreases, the distance between the two inductive coils to minimize and/or eliminate interference decreases between the two inductive coils. That is, the distance between the two inductive coils to prevent or reduce crosstalk is directly correlated with the amount of power driven through the closed-circuit that forms the inductive coils to generate the magnetic field to wirelessly transfer electrical energy and the overall strength of the magnetic field generated.

The charging system 100 determines whether one or more of the inductive coils 102*a-h* are aligned with the one or more inductive loops 212*a-b* of the vehicle 204 (512). The charging system 100 may sequentially activate each of the one or more inductive coils 102*a-h* to determine whether the one or more inductive coils 102*a-h* are aligned with the one or more inductive loops. In some implementations, the charging system 100 may determine whether the one or more of the inductive coils 102*a-h* are aligned based on the distance, the position and/or the location of the one or more inductive loops 212*a-b* and the current location of the one or more inductive coils 102*a-h*. The charging system 100 may compare the position and/or the location of the one or more inductive coils 102*a-h* with the position and/or the location of the one or more inductive loops 212*a-b* and calculate a distance that the two positions and/or locations are offset. If the distance is less than a threshold distance, the charging system 100 may determine that the inductive coils 102*a-h* are aligned with the inductive loops 212*a-b*. If not, the charging system 100 may determine that the inductive coils 102*a-h* are not aligned with the inductive loops 212*a-b*.

When the one or more inductive coils 102*a-h* are within the threshold distance and/or the position and/or the location of the one or more inductive loops 212*a-b* of the vehicle 204 allows the one or more inductive loops 212*a-b* to operate at peak efficiency, the charging system 100 may determine that the one or more inductive coils 102*a-h* are aligned with the one or more inductive loops 212*a-b*.

Figure 6:
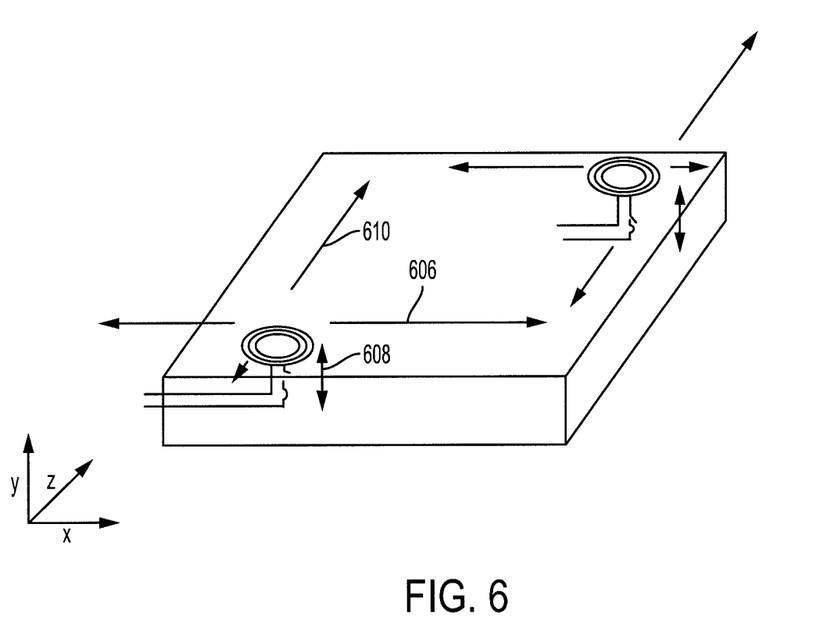
FIG. 6 shows the movement of one or more inductive coils to align with one or more inductive loops according to an aspect of the invention.

If the one or more inductive coils 102*a-h* are not aligned, the charging system 100 may move the one or more of the inductive coils 102*a-h* to the position and/or the location in proximity or within a threshold distance of an inductive loop of the one or more inductive loops 212*a-b* and/or provide directions and/or instructions to the driver to align the one or more inductive loops 212*a-b* with the one or more inductive loops (514). The movement may be based on the position and/or the location of the one or more inductive loops 212*a-b*. The movement may also be based on the magnitude, the direction and/or the strength of the magnetic fields of the one or more inductive coils 102*a-h* and/or the one or more inductive loops 212*a-b*. The charging pad 202 of the charging station 210 may have one or more rails that may move the one or more inductive coils 102*a-h* in various directions, as shown in FIG. 6, for example. The one or more inductive coils 102*a-h* may move three-dimensionally including in a lateral direction 606, e.g., in the direction 606 along the x-axis and the length of a vehicle and/or within a layer of inductive coils in a vertical direction 608 along the y-axis, e.g., between multiple layers of the inductive coils, and/or in a direction 610 along the z-axis e.g., along the width of a vehicle.

In some implementations, if the one or more inductive coils 102*a-h* are not aligned, the charging system 100 may indicate to a driver of the vehicle 204 that the one or more inductive coils 102*a-h* are not aligned with the one or more inductive loops 212*a-b* of the vehicle 204 as shown in FIG. 3, for example. The charging system 100 may provide directions and/or instructions, e.g., via the user interface 116, to navigate the vehicle 204 to align the one or more inductive coils 102*a-h* with the one or more inductive loops 212*a-b*. For example, the charging system 100 may display an arrow 302*a-d* to indicate that the vehicle 204 should move forward, backward, right or left using a forward arrow 302*b*, backward arrow 302*c*, left arrow 302*a*, or right arrow 302, respectively, as shown in FIG. 3, for example. The directions and/or instructions may be based on the position and/or the location of the one or more inductive loops 212*a-b* and/or the position and/or the location of the one or more inductive coils 102*a-h*.

The charging system 100 may provide an audio and/or visual indication to provide the instructions and/or directions to the driver of the vehicle 204. In some implementations, the charging system 100 may communicate to the vehicle 204, such as an autonomous vehicle, the directions and/or instructions.

The charging system 100 may activate the one or more inductive coils (516). The charging system 100 may activate based on the user input, such as the one or more configuration settings, or in response to the one or more inductive coils 102*a-h* being aligned with the one or more inductive loops 212*a-b* and/or the determined distance to reduce or eliminate the electrical interference. The two or more activated inductive coils may be spaced apart by the determined distance to minimize, reduce or eliminate the electrical interference between the activated inductive coils. For example, the configuration settings may indicate that the inductive coils 102*a* and 102*d* be activated in the configurable grid 110. In another example, the charging system 100 may determine that the inductive coils 102*b* and 102*e* be activated to align with the inductive loops of the vehicle 204. In another example, if the inductive coil 102*a* is activated, the charging system 100 may not activate the inductive coil 102*b* if the activation of the inductive coil 102*b* would cause electrical interference with the magnetic field generated from the inductive coil 102*a* based on the distance between the two inductive coils 102*a-b*. Instead, the charging system 100 may activate the inductive coil 102*c*, which may be further distance away than the inductive coil 102*b*.

The charging system 100 closes one or more switches 104*a-h* to form a closed-circuit with one or more inductive coils 102*a-h* within the configurable grid 110 to activate an inductive coil. The power source 108 drives an alternating current (AC) through the one or more inductive coils 102*a-h* that are in the closed-circuit and which are activated. The charging system 100 generates a magnetic field that is emitted by the one or more inductive coils 102*a-h* when the AC current passes through the one or more inductive coils 102a-h within the closed-circuit. When the one or more inductive coils 102a-h that are emanating the magnetic field are within a threshold distance of one or more inductive loops 212a-b of the vehicle, the magnetic field causes the one or more inductive loops 212a-b to generate current within the one or more inductive loops 212a-b. The current is converted into direct current (DC) by the one or more inductive loops 212a-b and stored in a battery of the vehicle 204 or used to run the vehicle 204.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An external vehicle charging system, comprising:
   a first inductive coil configured to move in three-dimensions to align with a first inductive loop of a vehicle and to provide a magnetic field to the first inductive loop of the vehicle;
   a camera configured to capture an image of an underside of the vehicle; and
   a processor coupled to the first inductive coil and the camera, the processor being configured to:
   obtain user input that includes a configuration setting that indicates to activate the first inductive coil from among a first plurality of inductive coils,
   identify the first inductive loop in the image of the underside of the vehicle,
   determine a position of the first inductive loop of the vehicle based on the image of the underside of the vehicle,
   determine a distance that the first inductive coil is offset from the first inductive loop of the vehicle based on the position of the first inductive loop of the vehicle and a location of the first inductive coil,
   determine whether the first inductive coil is aligned with the first inductive loop of the vehicle based on the distance, and
   activate the first inductive coil when the first inductive coil is aligned with the first inductive loop of the vehicle and the configuration setting that indicates to activate the first inductive coil is obtained.

2. The external vehicle charging system of claim 1, wherein the processor is further configured to:
   position the first inductive coil within a threshold distance of the first inductive loop.

3. The external vehicle charging system of claim 1, wherein the processor is further configured to move the first inductive coil in a vertical direction perpendicular to a plane of a charging pad and a lateral direction parallel to the plane of the charging pad.

4. The external vehicle charging system of claim 1, further comprising a second inductive coil that is adjacent to the first inductive coil and configured to provide the magnetic field to a second inductive loop of the vehicle.

5. The external vehicle charging system of claim 4, further comprising:
   a first layer of inductive coils that includes the first plurality of inductive coils, wherein the first plurality of inductive coils includes the first inductive coil and the second inductive coil; and
   a second layer of inductive coils that includes a second plurality of inductive coils.

6. The external vehicle charging system of claim 5, wherein the second plurality of inductive coils are vertically aligned and below the first plurality of inductive coils.

7. The external vehicle charging system of claim 5, wherein the second plurality of inductive coils are offset from the first plurality of inductive coils.

8. The external vehicle charging system of claim 1, wherein the three-dimensions include a first dimension along a length of the vehicle, a second dimension along a width of the vehicle and a third dimension perpendicular to a plane of a charging pad.

9. The external vehicle charging system of claim 1, wherein the processor is configured to:
   render, on a display, one or more indicators that indicate to a driver to move the vehicle forward, backward, to the left or to the right to align the first inductive loop and the first inductive coil.

10. A method for wirelessly charging a vehicle, comprising:
    capturing, using a camera, an image of an underside of the vehicle;
    obtaining, by a processor, user input that includes a configuration setting that indicates to activate a first inductive coil from among a plurality of inductive coils;
    identifying, by the processor, a first inductive loop of a plurality of inductive loops in the image of the underside of the vehicle;
    determining, by the processor, a position of the first inductive loop based on the image of the underside of the vehicle;
    determining, by the processor, a distance that the first inductive coil of the plurality of inductive coils is offset from the first inductive loop of the vehicle based on the position of the first inductive loop of the vehicle and a location of the first inductive coil;
    determining, by the processor, whether the first inductive coil is aligned with the first inductive loop of the vehicle based on the distance;
    moving, using the processor, the first inductive coil in three-dimensions to align the first inductive coil with the first inductive loop; and
    activating, by the processor, the first inductive coil when the first inductive coil is aligned with the first inductive loop of the vehicle and the configuration setting that indicates to activate the first inductive coil is obtained.

11. The method of claim 10, wherein the plurality of inductive coils include a second inductive coil, wherein the second inductive coil is adjacent to the first inductive coil.

12. The method of claim 10, wherein moving the first inductive coil in three-dimensions includes moving the first inductive coil in a lateral direction and in a vertical direction.

13. The method of claim 10, wherein identifying the first inductive loop of the plurality of inductive loops in the image of the underside of the vehicle includes comparing the first inductive loop to a database of objects to identify the first inductive loop.

14. The method of claim 13, wherein determining the position of the first inductive loop based on the image of the underside of the vehicle includes comparing dimensions of the first inductive loop to dimensions of an object in the database of objects.

15. The method of claim 10, further comprising:
sequentially activating each inductive coil of the plurality of inductive coils, wherein determining whether the first inductive coil is aligned with the first inductive loop of the vehicle is further based on the sequential activation of each inductive coil of the plurality of inductive coils.

16. A vehicle charging system, comprising:
a first inductive coil configured to move in three-dimensions to align with a first inductive loop of a vehicle;
a camera configured to capture an image of an underside of the vehicle; and
a processor coupled to the first inductive coil and the camera, the processor being configured to:
obtain user input that indicates a configuration setting that indicates to activate the first inductive coil from among a plurality of inductive coils,
determine a position of the first inductive loop of the vehicle based on the image of the underside of the vehicle,
determine a distance that the first inductive coil is offset from the first inductive loop of the vehicle based on the position of the first inductive loop of the vehicle and a location of the first inductive coil,
determine that the first inductive coil is aligned with the first inductive loop of the vehicle based on the distance, and
activate the first inductive coil when the first inductive coil is aligned with the first inductive loop of the vehicle and the configuration setting that indicates to activate the first inductive coil is obtained.

17. The vehicle charging system of claim 16, wherein the processor is further configured to:
position the first inductive coil within a threshold distance of the first inductive loop.

18. The vehicle charging system of claim 16, wherein the processor is further configured to move the first inductive coil in a vertical direction perpendicular to a plane of a charging pad and a lateral direction parallel to the plane of the charging pad.

19. The vehicle charging system of claim 16, wherein the three-dimensions include a first dimension along a length of the vehicle, a second dimension along a width of the vehicle and a third dimension perpendicular to a plane of a charging pad.

20. The vehicle charging system of claim 16, wherein the processor is configured to:
identify the first inductive loop in the image of the underside of the vehicle including comparing the first inductive loop to a database of objects to identify the first inductive loop.

\* \* \* \* \*